(12) United States Patent
Jones et al.

(10) Patent No.: US 6,208,441 B1
(45) Date of Patent: Mar. 27, 2001

(54) OPTICAL ADD/DROP WAVELENGTH DIVISION MULTIPLEX SYSTEMS

(75) Inventors: Kevan Peter Jones, Devon; David James Wall, Kent, both of (GB)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/011,514

(22) PCT Filed: Aug. 2, 1996

(86) PCT No.: PCT/GB96/01884

§ 371 Date: Sep. 4, 1998

§ 102(e) Date: Sep. 4, 1998

(87) PCT Pub. No.: WO97/06616

PCT Pub. Date: Feb. 20, 1997

(30) Foreign Application Priority Data

Aug. 4, 1995 (GB) .................................... 9516017

(51) Int. Cl.⁷ ...................................................... H04J 14/02
(52) U.S. Cl. ........................ 359/127; 359/130; 359/124; 385/24; 385/37
(58) Field of Search .................... 359/124, 127, 359/130, 187; 385/24, 37

(56) References Cited

U.S. PATENT DOCUMENTS

| 5,867,289 | * | 2/1999 | Gerstel et al. | 359/110 |
| 5,915,051 | * | 6/1999 | Damask et al. | 385/16 |
| 5,963,685 | * | 10/1999 | Nishino | 385/24 |
| 6,101,012 | * | 8/2000 | Danagher et al. | 359/127 |

FOREIGN PATENT DOCUMENTS

| 0543570 | 5/1993 | (EP) . |
| 0663738 | 7/1995 | (EP) . |
| 05-063643 | 3/1993 | (JP) . |
| 05-110511 | 4/1993 | (JP) . |

* cited by examiner

*Primary Examiner*—Kinfe-Michael Negash
(74) *Attorney, Agent, or Firm*—Ware, Freesola, Van Der Sluys & Adolphson LLP

(57) ABSTRACT

An optical-wavelength division multiplexing system, method and branching unit. The arrangement drops one, or more than one, predetermined wavelength signal($\lambda 2$) from a trunk(18) onto a branch and adds signals($\lambda 2'$) at the predetermined wavelength, or at a predetermined different wavelength from the branch out of the trunk. A sensor(34) senses the level of the signal(s) dropped and a controller(36), which responds to the control signal, adjusts the level of the add signal(s)($\lambda 2'$) to an optimum level for adding to the trunk (18).

18 Claims, 3 Drawing Sheets

OPTICAL ADD/DROP WAVELENGTH DIVISION MULTIPLEX SYSTEMS

FIELD OF THE INVENTION

This invention relates to add/drop wavelength division multiplexing systems and more particularly to the control of the level of added signals. The invention has particular application in underwater cable systems employing fiber cables.

BACKGROUND OF THE INVENTION

Wavelength division multiplexing, termed WDM, (discussed in, for example, Hill, British Telecom Technology Journal 6(3): 24–31) is a technique of considerable benefit in optimizing transmission of signals through fiber optic networks. In wavelength division multiplexing, traffic signals to be sent out by a station are modulated on to a number of carrier signals at different predetermined carrier wavelengths. Each predetermined carrier wavelength is allocated according to the identities of the send station and of the intended receive station. Predetermined carrier wavelengths will be spaced sufficiently far apart in wavelengths that they can be discriminated from each other by components of the fiber optic system, but in many networks will need to be grouped sufficiently closely that all carrier wavelengths can be amplified satisfactorily by the same amplifier in a repeater (or in unrepeated systems, to be carried long distances without significant loss). The carrying capacity of a single fiber is enhanced by WDM—rather than carrying a single signal, the fiber is simultaneously carrying several signals, each of a different wavelength.

Most such transmission networks have a number of nodes at which one or more branches form away from a main trunk or ring. Typically, at these nodes one or more carrier wavelengths are dropped down one fiber of the branch and one or more carrier wavelengths (which may be the same as, or different from, those dropped from the trunk or ring) are added to the trunk or ring from another fiber of the branch. The component which performs such a function is an Add/Drop Multiplexer (ADM).

WDM is particularly well adapted to efficient routing of signals between send and receive stations. As different signals have different carrier wavelengths, optical components can be used to route signals appropriately by directing them according to the carrier wavelength of the signal.

This can be done in an active manner, by splitting the signal into its component carrier wavelengths with a prism or similar component, and actively processing and routing the split signals to desired outputs. This solution is appropriate for use in an integrated device: a basic design for a multiplexer of this type is discussed in Dragone et al in IEEE Photonics Technology Letters 3(10): 896–899, and designs employing arrayed-waveguide gratings are disclosed for an ADM in Okamoto et al in Electronics Letters 31(9): 723–4 and for an optical splitter/router in Inoue et al in Electronic Letters 31(9): 726–7.

Alternatively, passive optical components can be used which respond differently to different carrier wavelengths. This enables passive network to be constructed.

The use of wavelength division multiplexing branching units (WDM BU) in optically amplified networks present new problems for the control and management of the networks. One of the problems is matching of the optical level of the added channel to the other channels passing along the trunk. I present a simple arrangement for controlling the power of the added channel from a branching unit to a trunk, so that it is added back into the system at the optimum level.

To equalize the performance of the different channels in a WDM system, pre-emphasis is applied to the powers of the channels. This may be effected in the manner described in A. R. Chraplyvy, J. A. Nagel, R. W. Tkach, "Equalisation in Amplified WDM Lightwave Transmission Systems", IEEE Photonics Tech. Lett., Vol. 4, pp. 920–922, 1992. This results in a system dependent power profile for the different channels. The dropping of channels from the line, and subsequent adding in of new channels (at the same wavelengths or even at different wavelengths) requires ideally that the level of the added channel(s) is such that it matches the trunk channels which pass straight through the BU.

Various methods of adjusting the levels of optical signals on a trunk are as follows:

European Patent Application Number 0663738A1 discloses an arrangement by which the amplitude of all signals in the trunk of an optical transmission system are controlled as a function of wavelength in a "regulation band" in the transmitted wavelength spectrum. It does not relate to a branching unit and provides no teaching as to how to adjust the level of a carrier signal to be added to a trunk from a branch unit in dependence upon the level of the carrier wavelength dropped.

European Patent Application No. 0543570A3 relates to the selective adjustment of the optical powers of each of the channels in an optical transmission system to equalise their powers by the provision of a telemetry signal from a station at the remote end of a trunk which relates to the level of that signal at the remote end of the trunk to a station at the input to the trunk. This does not relate to a wavelength division multiplexing add/drop branching unit and again provides no teaching of how to provide an add signal with different traffic signals back onto the trunk.

Japanese Patent Publication Number JP5110511 describes an arrangement by which a constant amplitude of two wavelength can be produced on a trunk at the output of an amplifier by comparing the generated wavelengths each with a different reference value so as to inject a compensating signal at a different one of a pair of multiplexers. It is not concerned with dropping and adding wavelengths between the trunk and a spur terminal.

The disclosure of Japanese Patent Publication Number JP5063643 is difficult to understand but seems to relate to the adjustment of gain of an optical amplifier 11 in dependence upon light sensed at the output of a trunk. There is no suggestion of dropping traffic signals from a trunk to a spur and adding traffic signals from such a spur back onto a trunk.

SUMMARY OF THE INVENTION

Accordingly, the present invention seeks to provide for the adding of wavelengths from a branching unit to the trunk of an optical fiber communication system at an optimum level.

According to the invention there is provided an optical wavelength division multiplexing add/drop branching unit for dropping one, or more than one, predetermined carrier wavelength(s), for carrying traffic signals, from a trunk to a branch terminal via a drop branch fiber and for adding different traffic signals on a carrier at said predetermined wavelength(s), or at predetermined different wavelength(s), from the branch terminal via an add branch fibre onto the trunk, characterized in sensing means for providing a control signal related to the level of the carrier wavelength(s)

dropped and control means responsive to the control signal to adjust the level of the carrier wavelength(s) of the add signal(s) to an optimum level for adding to the trunk.

According to another aspect of the invention there is provided a method of operating an optical fiber wavelength division multiplex communication system in which multiple wavelength signals are transmitted and received along a trunk cable by remote transmit/receive stations via a branching unit, one, or more than one, predetermined wavelengths are dropped by the branching unit onto a branch to a branch receive/transmit station and one, or more than one, of said predetermined wavelengths, or predetermined different wavelength(s) is/are added to the trunk from the branch received transmit station via the branching unit, characterized in that the level of the dropped wavelength(s) is/are sensed and used to control the level of the added wavelength (s) which are thereby introduced onto the trunk at an optimum level.

BRIEF DESCRIPTION OF THE DRAWINGS

In order that the invention and its various other preferred features may be understood more easily, some embodiments thereof will now be described, by way of example only, with reference to the drawings, in which.

DESCRIPTION OF PREFERRED EMBODIMENTS

Figure 1:
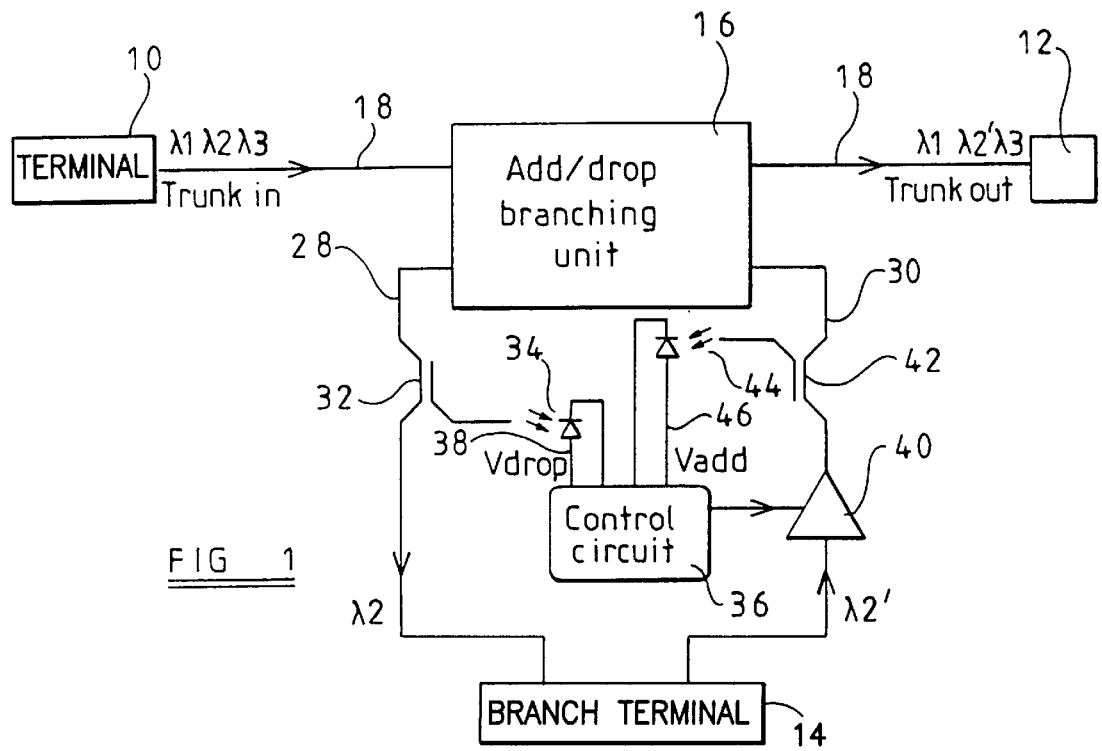
FIG.1 is a schematic block diagram to illustrate the basic concept of the invention in a simple single wavelength add/drop system.

The arrangement of FIG. 1 illustrates, for simplicity of explanation, a basic add/drop WDM system in which a single branch is employed along an optical fiber trunk cable 18 and in which three different wavelengths $\lambda_1$, $\lambda_2$, $\lambda_3$ are employed each for carrying signals specific to one of two terminals 10, 12, located one at each end of the trunk and one to a terminal 14 at the end of a cable branch. An add/drop branching unit 16 is connected in the optical fiber trunk cable 18 and is arranged to permit passage of wavelengths $\lambda_1$ & $\lambda_3$ between terminals 10 and 12 but to direct wavelengths $\lambda_2$ to the branch terminal 14.

Figure 2:
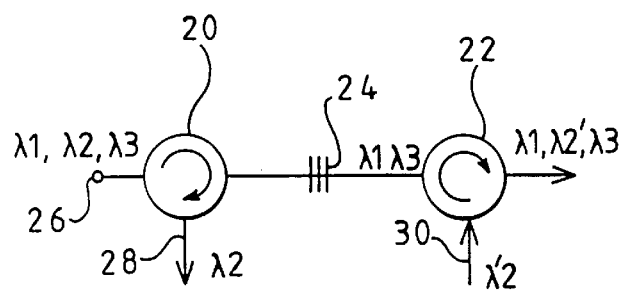
FIG. 2 illustrates schematically one suitable add/drop branching unit suitable for use in the system of FIG. 1.

A suitable add/drop branching unit 16 is illustrated in FIG. 2 and employs three port circulators 20, 22 and a Bragg reflection filter 24. A transmission at input 26 with carrier wavelengths $\lambda_1$, $\lambda_2$, $\lambda_3$ enters first circulator 20. The whole transmission passes out through the second port of the circulator to filter 24, which reflects the $\lambda_2$ component but allows the $\lambda_1$ and $\lambda_3$ components to pass. The $\lambda_2$ component thus proceeds to the second port of the first circulator 20, passes through to the next port in sequence, the third port, and thus passes out along drop branch 28. The added signal at carrier wavelength $\lambda_2'$ from add branch 30 enters the first port of the second circulator 22 and exits through the second port towards filter 24, which reflects it. The added $\lambda_2'$ signal thus joins the $\lambda_1$ and $\lambda_3$ signals of the main transmission in entering the second port of second circulator 22, and all three carrier wavelengths thus pass out through the third port of the second circulator 22. Such an ADM branching unit 16 is effective for adding and dropping signals at a given wavelength to a single line, but is not sufficient to enable efficient routing in a more complex network or for adding wavelengths different to the wavelength dropped. It is to be understood that any suitable add/drop branching units can be employed for example any of those disclosed in our copending PCT application No. WO-A-97/06614 filed the same day as the present application and entitled "Add/drop Multiplexer" the whole contents of the specification of which is hereby incorporated by reference.

Referring now again to FIG. 1 the carrier wavelength $\lambda_2$ on the drop branch 28 is routed to branch terminal 14. An optical tap 32 couples a portion of carrier wavelength $\lambda_2$ from the drop branch 28 to an optical sensor 34, e.g. a PIN diode as illustrated, which forms a first sensor for a control circuit 36 and provides a voltage V drop at 38.

The branch terminal 14 provides an add signal $\lambda_2'$ at the same wavelength as the drop signal and this is routed via a variable gain optical amplifier 40 through an optical tap 42 to the add branch 30 of the add/drop multiplexer branching unit 16. The tap 42 couples a portion of the add wavelength $\lambda_2'$ to an optical sensor 44, e.g. a PIN diode as illustrated, which forms a second sensor for the control circuit 36 and provides a voltage $V_{add}$ at 46. The control circuit 36 compares the voltages $V_{add}$ and $V_{drop}$ and provides a control signal to control the gain of optical amplifier 40 in dependence upon the relative levels of the signals at drop branch 28 and add branch 30 to optimize the level of the add signal for coupling to the trunk.

Ideally the level of the added channel (at 30) would be matched to the level of the dropped channel (at 28), if the loss from the trunk-in to the drop is equal to the loss of the add to the trunk out. This would result in the same level being added to the trunk, at $\lambda_2'$ in this case, as is being dropped from the trunk. Since the losses of the two taps are known (measured on build), the powers measured by the photodiodes 34, 44 can be used to assess the optical powers at 28 and 30. The control circuit allows balance of these powers by adjusting the pump level (output level) of the optical amplifier on the add fiber.

In practice the add/drop multiplexer 16 has a finite loss (e.g. $L_{ADM}$ dB) and by the set up of the control circuit 36, the level at 30 can be set to $L_A - L_{ADM}$ dNm (where $L_A$ is the power at 28) to add the new wavelength in at the level that the dropped channel would have been at the output of the add/drop multiplexer.

Figure 3:
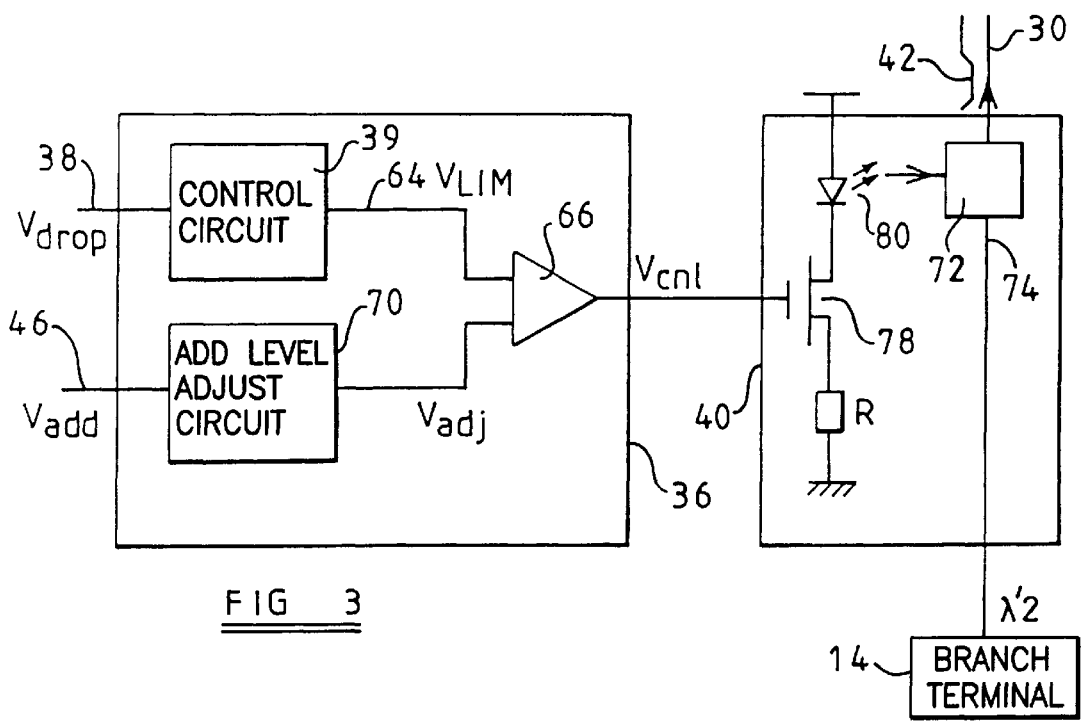
FIG. 3 is a block schematic diagram providing further detail of a control circuit and laser pump optical amplifier of the system shown in FIG. 1.
Figure 4:
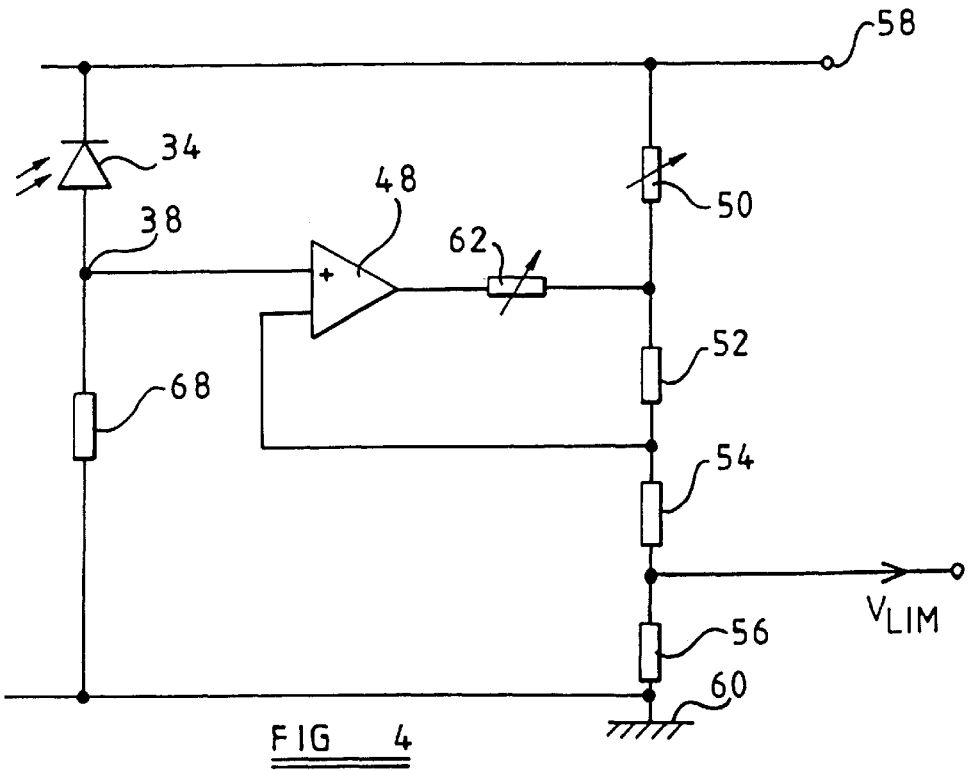
FIG. 4 is a block schematic circuit diagram illustrating a limited control circuit suitable for use in the arrangement of FIG. 3.

Referring now to the drawing of FIG. 3, the control circuit 36 and optical amplifier 40 are shown in more detail. The drop voltage $V_{drop}$ at 38 is input to a limited control circuit 39. This circuit is intended to provide a low input threshold for the drop signal so that if the drop wavelength is removed the amplifier does not turn itself up to full level on noise, but that it is inhibited to a lower level. This circuit is described with reference to FIG. 4 from which it can be seen that the voltage $V_{drop}$ 38 forms one input for an operational amplifier 48. A series resistor network is formed by a first resistor 50 a second resistor 52, a third resistor 54 and a fourth resistor 56 connected in series between different d.c. voltage supply lines 58, 60. The other input of the operational amplifier 48 is coupled to the junction between the second and third resistors and the output of the operational amplifier is coupled to the junction between the first and second resistors via a resistor 62. The junction between the third and fourth resistors provides a limited control voltage $V_{LIM}$ at 64 which forms an input to a comparator 66 illustrated in FIG. 3.

The sensor 34 is connected in series with a resistor 68 between d.c. supply terminals 58, 60 and the voltage $V_{drop}$ is developed across the resistor 68. The voltage $V_{drop}$ varies proportionally to the total optical power detected by the sensor 34. The output of the operational amplifier 48 follows $V_{drop}$ and is capable of large voltage swings which are limited by voltages provided by the series resistor network. The value of resistor 62 influences the available voltage output swing and by making this resistor variable, the swing can be adjusted. The value of the resistor 50 influences the upper limit of voltage output and by making this resistor variable, the upper voltage limit can be adjusted. For a single channel system, as so far described, the upper level adjustment is not required and the lower limit can be set to provide a low input threshold for the operational amplifier 48. This stops the optical amplifier from being turned full on when there is no drop channel wavelength.

Referring now to FIG. 3 the add level voltage V add at 46 is routed via an add level adjust circuit 70 to the other input of the comparator 66. In a simple single drop wavelength system this might be a manual adjustment during build but in a system where more than one wavelength is dropped and added a more complex arrangement for compensating for the absence of one or more dropped wavelengths after the system has been installed is advisable as will be described later in connection with FIG. 5.

Referring again to FIG. 3 the optical amplifier 40 is shown as comprising a pump laser amplifier 72 having its input 74 coupled to the branch terminal 14 for receiving the add wavelength $\lambda_2'$. The output of the amplifier 72 is coupled to the add branch 30. An output voltage $V_{enl}$ out from the comparator 66 forms the input to the gate electrode of a field effect transistor 78 that controls the current flowing through the transistor to a laser pump 80. Thus the pump drive current is changed to keep the level of $V_{adj}$ equal to $V_{LIM}$.

Figure 5:
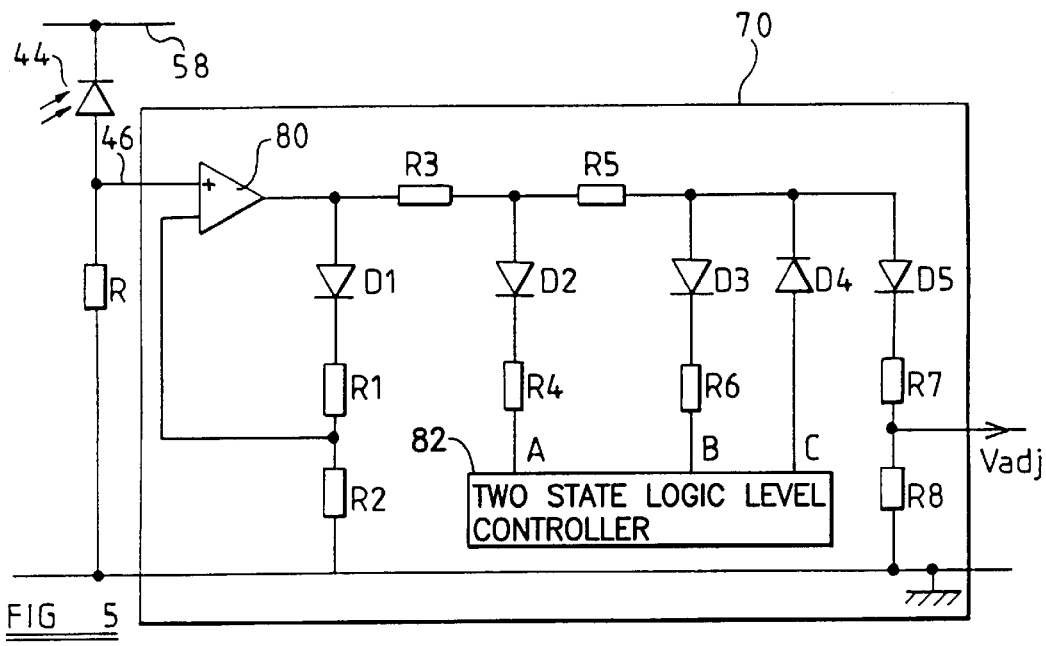
FIG. 5 is a block schematic circuit diagram illustrating an add level adjust circuit suitable for use in the arrangement of FIG. 3.

Although most of the preceding description has been in relation to a simple system in which a single wavelength is dropped and added at a branch more complex systems within the ambit of this invention can drop and add a plurality of wavelengths at a branch. A difficulty which arises in such a system is that the voltage $V_{drop}$ is related to the aggregate level of the detected dropped wavelengths and the absence of one or more of the wavelengths suggests that the signal level to be added needs to be reduced. This situation can be corrected by employing an add level adjust circuit 70 in the form of an attenuator as illustrated in FIG. 5. The voltage $V_{add}$ at 46, which relates to the sensed add signal, forms one input for an operational amplifier 81 and the output is coupled via an attenuation network comprising diodes D1 to D5 and resistors R1 to R8. The diodes D2 to D4 are controlled from a two state logic level controller 82. Applying logic high or logic low at combinations of A, B & C select particular resistor combinations and vary the output voltage $V_{adj}$ which is fed to the comparator 66 (FIG. 3). The attenuator is controlled by supervisory signals sent from a remote terminal, upon detection of the absence of signals at particular wavelengths, as will now be described in connection with FIG. 6 & 7.

Figure 6:
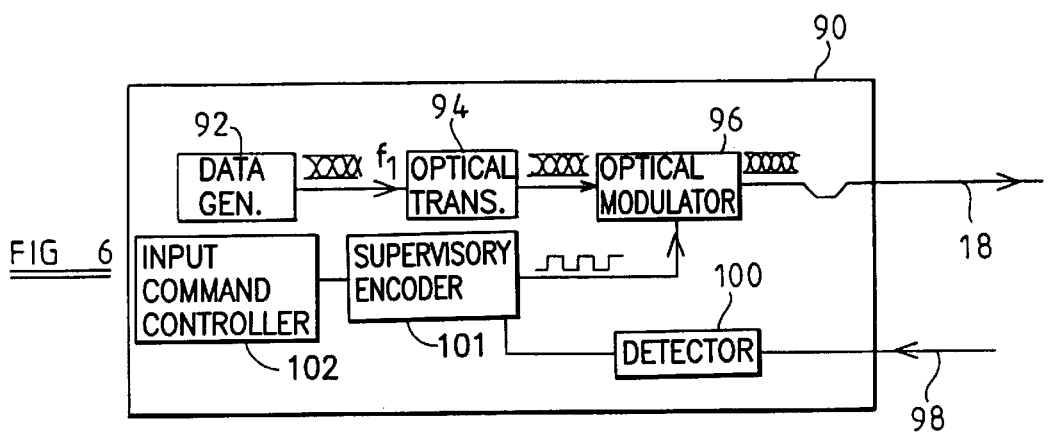
FIG. 6 is a block schematic diagram illustrating a supervisory function suitable for use in a system in which a plurality of wavelengths are dropped and added at a branch.

FIG. 6 shows a remote terminal 90 including a transmission data generator 92 coupled with an optical transmitter 94 to an optical modulator 96 which feeds the trunk 18. Data received on an incoming trunk fiber 98 or fibers is coupled to a detector 100 which is arranged to detect the presence of specific wavelengths. This can be done in any suitable manner such as will be clear to a person skilled in the art for example the different wavelengths can be separated by filtering with Bragg gratings and individually detected by a photosensitive diode. The detected information is fed to a supervisory encoder 101 which generates a specific digital code indicative of the presence or absence of each particular wavelength and this code is fed to the optical modulator for transmission. An input command controller 102 is effective to initiate transmission of supervisory signals by initiating the supervisory encoder to send to e.g. a set add level to minimum digital code. The frequency of the supervisory system is arranged to be lower than the frequency of the transmitted data.

Figure 7:
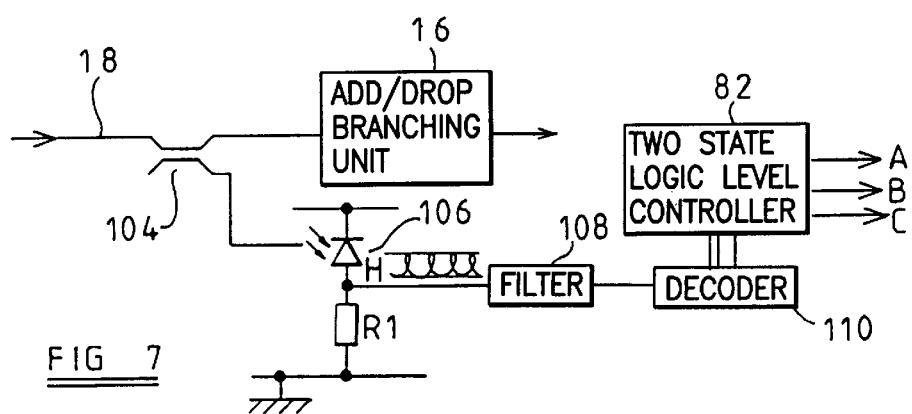
FIG. 7 is a block schematic diagram illustrating the use of a supervisory signal to attenuate an add signal.

Referring now to FIG. 7 at the branching unit a small amount of the light passing through the BU is tapped off via a 20:1 tap coupler 104 (the ratio is not critical, this in practice would be the same type of coupler as 32 & 42 in (FIG. 1). The light is incident on an optical sensor 106 which converts the signal to an electrical signal H.

The electrical signal is then filtered using a narrow bandpass filter 108 centered on the supervisory frequency. This is then decoded by decoder 110 and the command words acted upon by the 2 state logic level controller 82 also shown in FIG. 5.

It would also be possible to have a limited adjustment on the power at add branch 30 relative to drop branch 28 (FIG. 1) via the amplifier supervisory scheme. This would allow the add level to be adjusted up and down relative to the drop level at 28, in the event that the transmission distance from primary node 10 to 28 is very much less (or more) than the distance from 30 to primary node 12. This would allow for very fine adjustment of the pre-emphasis to maintain the optimum independence of the location of the BU within the system.

A further advantage of this system is that the accuracy of setting of the output power of the secondary node terminal is much reduced. So long as the level does not get too low, and degrade the optical signal to noise ratio, then the output power controlled amplifier will maintain the correct output independent of the input level from the secondary node transmitter. This also benefits system security.

Some possible advantages of systems constructed in accordance with the invention or its refinements are 1. Level of add channel automatically adjusted to be equal to level of drop channel.
2. Optimum system pre-emphasis levels maintained.
3. Simple BU design—Output amplifier automatically adjusts independent of system application.
4. Simplicity of adjustment of pre-emphasis. Only done at Primary nodes of network.
5. Reduced constraints on the accuracy of the secondary node output power.
6. Power offset relative to drop power available for optimum adjustment in asymmetric system topographies.

What is claimed is:

1. An optical wavelength division multiplexing add/drop branching unit for dropping at least one predetermined carrier wavelength, for carrying traffic signals, from a trunk to a branch terminal via a drop branch and for adding at least one carrier wavelength, for carrying traffic signals, from the branch terminal to the trunk via an add branch, the branching unit comprising:

A) drop signal sensing means for sensing the level of the at least one predetermined carrier wavelength dropped on the drop branch and for providing a control signal related to the level of said at least one dropped carrier wavelength; and B) control means responsive to the control signal for adjusting the level of the at least one carrier wavelength added on the add branch to an optimum level for adding to the trunk.

2. A branching unit as claimed in claim 1, wherein the drop signal sensing means comprises an optical to electrical transducer which provides a drop level electrical signal which is a function of the level of light signals of the at least one predetermined carrier wavelength dropped on the drop branch.

3. A branching unit as claimed in claim 2, and further comprising add signal sensing means for providing an add level electrical signal which is a function of the level of light signals of the at least one carrier wavelength added on the add branch, wherein the control means includes a comparator which compares the add level electrical signal with the drop level electrical signal and provides a comparison signal for adjusting the level of the at least one predetermined carrier wavelength added on the add branch to an optimum level for adding to the trunk.

4. A branching unit as claimed in claim 3, wherein the drop signal sensing means and the add signal sensing means are each respectively coupled to the drop branch and the add branch via an optical tap.

5. A branching unit as claimed in claim 3, wherein the drop signal sensing means and add signal sensing means respectively provide a variable voltage signal and the comparator is a voltage comparator which forms the comparison signal.

6. A branching unit as claimed in claim 5, wherein the voltage comparator is an operational amplifier.

7. A branching unit as claimed in claim 5 wherein each of the drop sensing means and add signal sensing means comprises a series arrangement of a PIN diode and a resistor coupled between different d.c. voltage supply lines and the voltage developed across the resistor forms the respective electrical signals.

8. A branching unit as claimed in claim 5 and further comprising a threshold circuit provided between said drop signal sensing means and the comparator, the threshold circuit preventing response of the comparator until a predetermined level of the at least one predetermined carrier wavelength dropped on the drop branch is sensed.

9. A branching unit as claimed in claim 8, wherein the threshold circuit comprises a threshold circuit operational amplifier and a series resistor network having four resistors the coupled between different d.c. voltage supply lines, and wherein one input of the threshold circuit operational amplifier is coupled to receive the voltage from drop signal sensing means, the output of the threshold circuit operational amplifier is coupled to the function between first and second resistors in the series network, the other input of the threshold circuit operational amplifier is coupled to the junction between the second and third resistors in the network, and the junction between the third and fourth resistors in the network forms a threshold limited output voltage.

10. A branching unit as claimed in claim 9, wherein the threshold circuit further comprises a variable resistor provided in the coupling between the output of the threshold circuit operational amplifier and the junction between the first and second resistors in the network, which variable resistor permits adjustment of a voltage range of the threshold limited output voltage.

11. A branching unit as claimed in claim 9, wherein the first resistor of the network is a variable resistor which permits adjustment of an upper voltage limit of the threshold limited output voltage.

12. A branching unit as claimed in claim 5 and further comprising an attenuator for adjusting the level of the predetermined carrier wavelength added on the add branch in response to a supervisory signal applied to a control input of said attenuator, said supervisory signal provided from a remote terminal connected to the trunk upon detection of one or more predetermined carrier wavelengths at said remote terminal.

13. A branching unit as claimed in claim 12, wherein the attenuator comprises a two state logic level device in which two resistors are selectively switched into an attenuator network upon detection of an individual logic code on a supervisory wavelength.

14. A branching unit as claimed in claim 1, wherein the at least one predetermined carrier wavelength to be added to the trunk is routed to the trunk via an add signal optical amplifier responsive to the control means to adjust the level of the at least one predetermined carrier wavelength added to the trunk.

15. An optical fiber wavelength division multiplex communication system comprising:

A) a trunk cable extending between two remote transit/receive stations;

B) an optical wavelength division multiplexing add/drop branching unit for dropping one or more predetermined carrier wavelengths from the trunk cable to a branch terminal and for adding one or more predetermined carrier wavelengths from the branch terminal to the trunk cable, each of the dropped and added predetermined carrier wavelengths having a level; and C) means associated with the branch terminal for sensing the level of the one or more predetermined carrier wavelengths dropped from the trunk and for adjusting the level of the one or more predetermined carrier wavelengths added to the trunk cable in response to the level of the one or more predetermined carrier wavelengths dropped from the trunk.

16. A communication system as claimed in claim 15, and further comprising a detector provided at a remote station adapted for detecting the presence of one or more of the predetermined carrier wavelengths, a supervisory signal generator which, in the absence of any of the predetermined carrier wavelengths provides a supervisory control signal to the branch terminal, and an attenuator at the branch terminal responsive to the supervisory circuit for reducing the level of the one or more predetermined carrier wavelengths added to the trunk cable.

17. A method of operating an optical fiber wavelength division multiplex communication system in which multiple carrier wavelengths are transmitted and received along a trunk cable by remote transmit/receive stations each including a branching unit, the method comprising:

A) transmitting multiple carrier wavelengths along the trunk cable;

B) dropping one or more predetermined dropped carrier wavelengths from the trunk to a branch transmit/receive station;

C) sensing the level of the dropped carrier wavelengths;

D) adding one or more predetermined added carrier wavelengths from the transmit/rescue station to the trunk cable; and E) controlling the level of the one or more predetermined added carrier wavelengths as a function of the sensed level of the one or more dropped predetermined carrier wavelengths.

18. A method as claimed in claim 17 and further comprising:

F) sensing the absence of one or more carrier wavelengths at one of the remote/transmit/receive stations;

G) transmitting a supervisory signal from the remote station at which the absence of the one or more carrier wavelengths is sensed; and H) attenuating the added carrier wavelength in response to the supervisory signal.

* * * * *

UNITED STATES PATENT AND TRADEMARK OFFICE
CERTIFICATE OF CORRECTION

PATENT NO. : 6,208,441 B1
DATED : March 27, 2001
INVENTOR(S) : Kevan Peter Jones and David James Wall It is certified that error appears in the above-identified patent and that said Letters Patent is hereby corrected as shown below:

Title page,
Add the following after "05-110511 4/1993 (JP)":
-- OTHER PUBLICATIONS
Patent Abstracts of Japan, vol. 017, no, 466 (E-1421) 25 August 1993.

Patent Abstracts of Japan, vol. 017, no. 378 (E-1398) 15 July 1993.

IEEE Photonics Technology Letters, February 1993 USA vol. 5, no. 2, XP000362879, TOBA H ETAL: "A 100 channel optical FM six-stage in-line amplifier system employing tunable gain equilizers". --

ABSTRACT,
Line 7, "a" should be deleted.
Line 8, "length" should be -- lengths --.

Column 7,
Line 59, "function" should be -- junction --.

Signed and Sealed this

Twenty-ninth Day of January, 2002

Attest:

JAMES E. ROGAN
*Attesting Officer*      *Director of the United States Patent and Trademark Office*